Nov. 6, 1923.

R. VENZLAFF 1,473,129

HAND MOTOR PLOW

Filed May 3, 1922

Inventor
R. Venzlaff,
By Marks & Clerk
Attys.

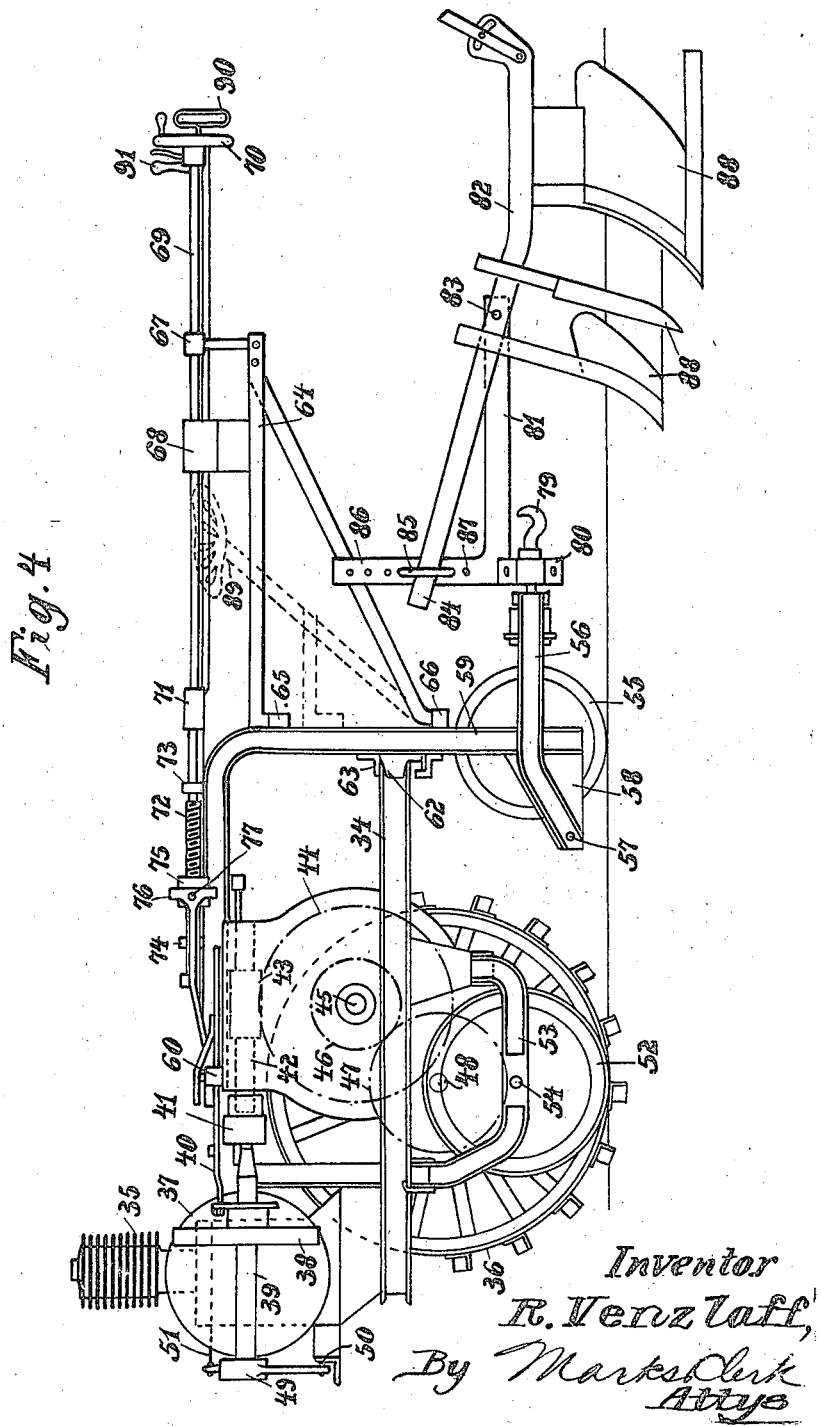

Patented Nov. 6, 1923.

1,473,129

UNITED STATES PATENT OFFICE.

RICHARD VENZLAFF, OF BERLIN, GERMANY.

HAND MOTOR PLOW.

Application filed May 3, 1922. Serial No. 558,062.

*To all whom it may concern:*

Be it known that I, RICHARD VENZLAFF, of Richthofenstrasse 29, Berlin 0.34, Germany, engineer, have invented certain new and useful Improvements in Hand Motor Plows, of which the following is a specification.

The invention relates to improvements in hand motor plows. According to the invention the motor is mounted upon an underframe supported by two wheels, of which the one is driven while the other runs freely upon the axle. The beam of the plow is connected with the underframe by means of a journal. In the one form of embodiment the journal connection is provided on an extension of the underframe protruding towards the rear, and directly behind the driven wheel. In another form of embodiment the journal connection is mounted vertically upon the underframe above the wheel axle. The plow is swung round the journal connection of the underframe by turning the plow beam. A special footstep bearing is provided between the plow beam and the journal in order to adjust the share.

In the drawings—

Fig. 4 is a side view of Fig. 3 on enlarged scale.

Figure 1:
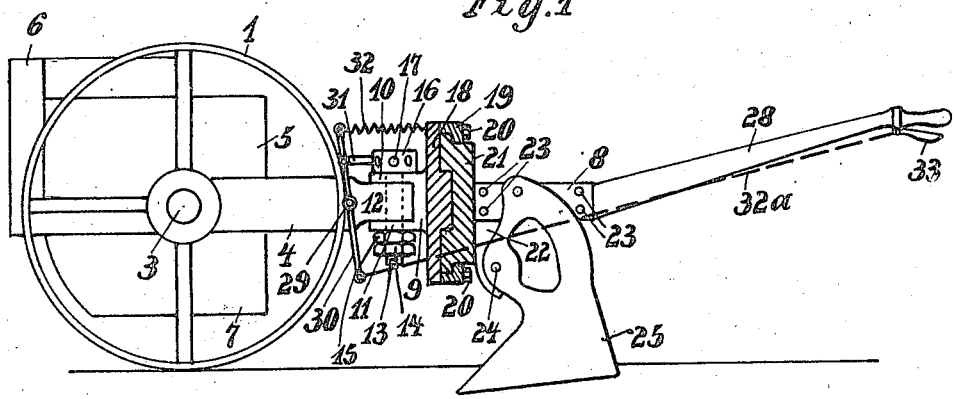
Fig. 1 is a side view of the motor plow in the one form of embodiment in partial section.
Figure 2:
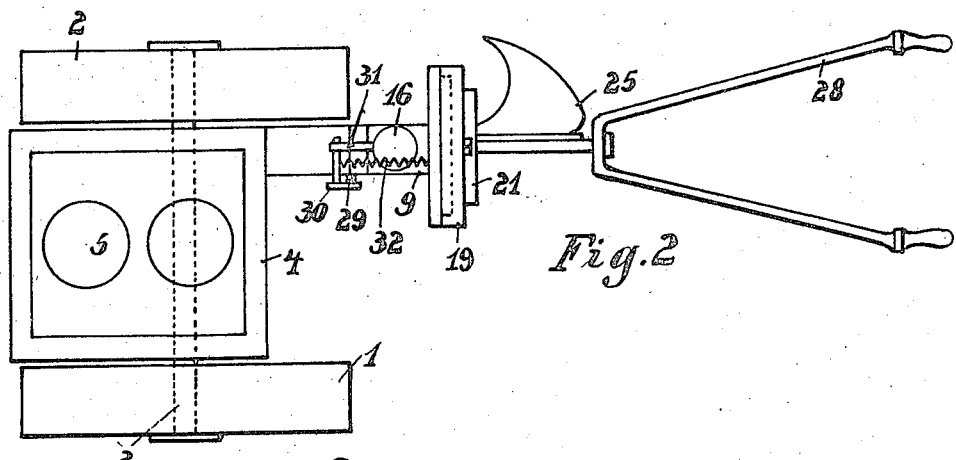
Fig. 2 is a plan view of Fig. 1.

Referring to Figs. 1 and 2, 1 and 2 represent the two wheels which rotate upon the common axis 3. A frame 4 carrying the motor 5, the radiator 6, the radiator water container 7, and other parts is carried upon the axle. The wheel 1 is driven by suitable means, while the wheel 2 runs freely. The plow beam 8 is connected up with the frame 4 behind the driven wheel by an intermediate piece 9. This intermediate piece is formed in fork manner, and engages the two fork members 10 and 11 above an extension 12 upon the one rear side of the frame 4. The connection of the frame 4 with the intermediate piece 9 is effected by a bolt 13, which is firmly held by means of the nut 14 and the security nut 15. The bolt head 16 is formed in cylindrical manner and provided with radially running holes 17 upon the circumference. The intermediate piece 9 finishes in a footstep bearing 18, upon the edge of which the flange ring 19 is screwed by means of the screws 20, in order to firmly secure a footstep bearing piece 21 in revoluble manner which forms the front end of the plow beam 8. A bearing plate 22 is fixed into this plow beam by means of the rivet 23. The footstep bearing formed in this way is self-locking. The share 25 is swingingly and adjustably located at 24 upon the plate 22. The fork-like handgrip 28 is fixed on to the plow beam towards the rear end.

A locking mechanism works in conjunction with the head 16 of the journal 13, consisting of a double-armed lever 30 linked on to the frame at 29 and provided with a locking pin 31. A spring 32 tends to move the lever 30 round the journal 29 in such a way that the locking pin 31 slips into one of the holes 17 of the headpiece 16. A rope or a rod 32$^a$ is attached to the other end of the lever leading to a hand lever 33 which is mounted upon one of the hand grips, in order to exert a tension effect upon the lever 30 by means of the rope 32 by the movement of the hand lever 33.

The steering of the plow share is effected by means of the hand grip fork 28, in that this is turned together with the plow beam 8 and the footstep bearing 21 round the footstep bearing 18, without, however, altering the direction of the plow itself. This turning movement can be effected in simple manner in that a decreased pressure is exerted upon the right or left hand handgrip according to the direction of the turn.

It is thus possible without complicated steering or guiding devices to steer the motor plow in circular manner over the field. This is attained by the relative arrangement of the plow beam 8 with the intermediate piece 9 to the frame 4, turnable in a horizontal plane by the employment of the journal 18 described above. The journal 18 is rigidly connected with the forks 10 and 11 of the intermediate piece 9 by means of the nuts 14 and 15, so that a turning of the intermediate piece 9 with the fork upon the frame portion 12 is possible. Simultaneously with this turning movement the head 16 of the journal 18 also turns. This turning movement is likewise effected by means of the hand grip fork in a horizontal plane. In order now to be able to describe a continuous arc or curve by means of the plow the locking device described above is provided, which consists of the locking bolt 31 which springs into one of the holes 17 of the journal and fixes the necessary angular relation of the plow beam to the underframe. If for example a circular portion is to be plowed the locking bolt 31 is withdrawn from the temporarily secured hole 17 by means of the rope 32 and the lever 30 by operation of the hand lever 33, and the plow beam turned by means of the hand grip fork 28. When the correct position for circular travelling is attained the hand lever 33 is released and the spring 32 draws on the lever 30, whereupon the locking bolt 31 springs into the corresponding hole, so that the once adjusted position of the plow beam to the underframe is maintained and permits an arc or curved portion to be plowed.

Figure 3:
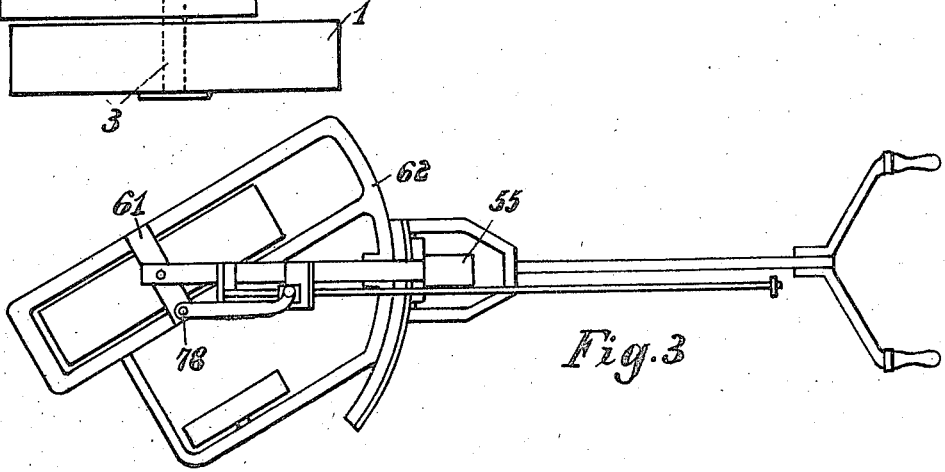
Fig. 3 is a plan view of the second form of embodiment of the motor plow.

With the form of embodiment represented in Figs. 3 and 4 the journal is mounted between the plow beam and the underframe, vertically above the driving shaft of the driving wheel. The motor 35 is arranged upon the frame 34, the motor operating the driving wheel 36 by an intermediate gear. The fly wheel 37 of the motor is formed as a friction disc, and is in engagement with the friction disc 38, which can be moved upon the shaft 39 by the lever 40. The shaft 39 rests with the one end in a universal joint 41 and is coupled by this joint with the worm shaft 42 upon which the worm 43 is located. The worm stands in engagement with the worm wheel 44 upon the shaft of which the pinion 46 is wedged, engaging with the pinion 47 located upon the axle 48, upon which the driving wheel 36 is mounted. The other end of the shaft 39 rests in a bearing 49 which can be turned round the bolt 50 by operation of the wire rope 51 to lift the disc 38 from the friction disc 37 and thereby disengage the motor and the driving wheel 36. As explained above the driving wheel 36 is fixed upon the axle 48. In order to support the frame as compared with the ground a supporting wheel 52 is located at 54 in the bow piece 53 on the side of the driving wheel 36. The bow piece can be moved in a lateral direction to the frame 34 to alter the width of the plow. A further supporting wheel is positioned in the bow piece 56 which can be rotated round a bolt 57 in a vertical direction. The bolt 57 is situated in the plate 58 which is mounted upon a turnable frame 59. This turnable frame has an angular form and is rotatable upon the bolt 60 mounted upon a bridge piece 61, which in its turn is fixed upon the upper part of the frame 34. The turnable frame 59 together with the supporting wheel 55 can in this way be revolved round the bolt 60 in order to steer the plow.

The portion of the frame 34 lying towards the supporting wheel 55 is formed as a circular rail piece, while the turnable frame 59 is provided with a corresponding circular rail 63. The steering itself is effected by a pinion drive. For this purpose a supporting bracket is detachably mounted upon the turning frame 59 at 65 and 66. The bearings 67 and 68 are situated upon the supporting bow piece for the rods for the steering and for the operating of the motor. For steering the plow the rod 69 is provided on the one end with a hand wheel 70, while the other end of the rod engages with a screw spindle 72 through a coupling 71. The screw spindle rests in the bearings 73 and 74, which for their part are fixed upon the turnable frame 59. A nut 75 is located upon the spindle upon which a rod 76 is linked at 77. The other end of the rod is turnably arranged upon the bridge 61 at 78 by means of a bolt. If the hand wheel 70 is turned a movement of the turning frame 59 in relation to the vehicle frame 34 occurs by the sliding of the nut 75 upon the spindle 72 through the connection of the rod 76 between the turnable frame 59 and the vehicle frame 34, whereby the rail portion 63 is displaced upon the guide portion 62 as is represented in Fig. 3.

The bow piece 56 connected with the turnable frame 59 is provided with a hook 79 and an angular tie rod 81 is fixed upon the hook by the plate 80. A customary plow is detachably mounted upon this tie rod. For this purpose the plow beam 82 is fixed in a vertical position turnable to the tie rod 81 by a bolt 83. The other end 84 of the plow beam 82 is firmly held upon the vertical member 86 of the tie rod 81 by means of an insertable bow piece 85. For this purpose holes 87 are provided in the member 86 in order to be able to adjust the end 84 of the plow beam 82 to the tie rod according to choice. The plow shares 88 are mounted upon the plow beam 82. In place of the plow beam 82 with the plow shares 88 another agricultural implement may be fixed upon the tie rod 81. The tie rod 81 may also be removed upon releasing the plate 80 in order to employ the underframe as tractor. In this case the supporting bow pieces 64 are removed and a detachable seat mounted upon the turning frame 59 at 66. The rod 69, together with the coupling 71, is removed from the spindle 72, and the hand wheel 70 mounted directly upon the spindle 72. Further handgrips 90 and 91 are provided to control the motor and the friction coupling.

I claim as my invention:

1. A hand motor plow of the kind indicated embodying an underframe, wheels and a motor located thereon, a plow beam pivotally connected to said under frame for movement in a substantially horizontal plane, a coupling forming a connection between the underframe and the plow beam, and a steering device for the underframe and the plow beam movable in a substantially horizontal plane with the plow-beam relatively to the under-frame.

2. In a hand motor plow, an underframe; two laterally arranged wheels and a motor located thereon, the motor being arranged between said wheels; a plow beam rotatable about a longitudinally extending axis; a coupling between the underframe and the plow beam arranged behind the driven wheel of the underframe and consisting of a vertical bolt forming the hinged connection between an extension of the underframe and a fork-like member finishing in a half bearing having a longitudinally extending substantially horizontal axis, the other half forming the front end of the plow beam; and a steering device in the form of a locking mechanism pivotally arranged on the underframe and engaging holes in the head of the bolt rigidly connected with the coupling piece.

3. In a hand motor plow, an underframe; one driving wheel and a motor located thereon; a laterally movable supporting wheel in a bow piece of the underframe; a turnable frame hingedly connected directly above the driving wheel with a bolt upon a bridge of the underframe and guided on a circular rail of the underframe; a supporting wheel arranged on a bow piece hingedly connected with the vertical end of the turnable frame; an angularly formed tie rod detachably connected to this bow piece; a plow beam hingedly connected on the horizontal end of the tie rod and adjustably connected on the vertical member; and a steering device having a screw spindle seated on the turnable frame and engaging a nut hingedly connected with a rod the other end of which pivotally engages with the bridge of the underframe.

4. In a hand motor plow, an underframe; one driving wheel and a motor seated thereon; a gear in combination with an adjustable friction disc engaging the fly wheel of the motor; a laterally movable supporting wheel in a bow piece of the underframe; a turnable frame hingedly connected directly above the driving wheel with a bolt upon a bridge of the underframe and guided on a circular rail of the underframe; a supporting wheel arranged on a bow piece hingedly connected with the vertical end of the turnable frame; an angularly formed tie rod detachably connected to this bow piece; a plow beam hingedly connected on the horizontal end of the tie rod and adjustably connected on the vertical member; and a steering device having a screw spindle seated on the turnable frame and engaging a nut hingedly connected with a rod the other end of which pivotally engages with the bridge of the underframe.

In testimony whereof I have affixed my signature in the presence of two witnesses.

RICHARD VENZLAFF.

Witnesses:
RICHARD GRINBY,
ERVIN BUDIER.